(12) United States Patent
Li et al.

(10) Patent No.: US 12,353,927 B2
(45) Date of Patent: Jul. 8, 2025

(54) BUFFER POOL RESOURCE ALLOCATION

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Rui Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 17/537,669

(22) Filed: Nov. 30, 2021

(65) Prior Publication Data

US 2023/0168952 A1 Jun. 1, 2023

(51) Int. Cl.
*G06F 16/2455* (2019.01)
*G06F 9/50* (2006.01)
*G06F 9/54* (2006.01)

(52) U.S. Cl.
CPC ............ *G06F 9/544* (2013.01); *G06F 9/5016* (2013.01); *G06F 9/546* (2013.01); *G06F 16/24552* (2019.01)

(58) Field of Classification Search
CPC .. G06F 9/544; G06F 16/24552; G06F 9/5016; G06F 9/546
See application file for complete search history.

(56) References Cited

U.S. PATENT DOCUMENTS 7,127,534 B2 * 10/2006 Jackson ................ G06F 13/385
710/52
7,143,263 B2 * 11/2006 Anand ................... G06F 12/023
711/170
8,010,337 B2 8/2011 Narayanan
9,588,891 B2 3/2017 Atkisson
2002/0046204 A1 4/2002 Hayes
(Continued)

OTHER PUBLICATIONS

Authors et. al.: Disclosed Anonymously, "A method about improving buffer pool performance of Database based on cognitive computing", An IP.com Prior Art Database Technical Disclosure, IP.com No. IPCOM000251750D, IP.com Electronic Publication Date: Dec. 1, 2017, 4 pages.
(Continued)

*Primary Examiner* — Ken Hoang
(74) *Attorney, Agent, or Firm* — Matthew Zehrer; Andrew D. Wright; Calderon Safran & Wright P.C.

(57) ABSTRACT

A computer implemented method for managing buffer pool usage includes identifying a database comprising one or more buffer pools and a set of database objects, adding a virtual layer between the set of database objects and the one or more buffer pools, wherein the virtual layer is configured to manage buffer pool resource utilization, managing, using the added virtual layer, buffer pool resource utilization with respect to the set of database objects, wherein the managing comprises defining buffer pool usage corresponding to the set of database objects, dynamically mapping database objects to the buffer pools based, at least in part, on the defined buffer pool usage, analyzing, by one or more processors, queues to identify updated buffer pool usage, and adjusting database object allocation according to the identified updated resource usage. A computer program product and computer system corresponding to the method are also disclosed.

20 Claims, 11 Drawing Sheets

(56) References Cited

U.S. PATENT DOCUMENTS

| | | | |
|---|---|---|---|
| 2003/0037049 A1* | 2/2003 | Weigelt | G06F 9/5016 |
| | | | 707/999.005 |
| 2008/0140937 A1* | 6/2008 | Nalawade | G06F 12/0871 |
| | | | 711/119 |
| 2014/0344504 A1* | 11/2014 | Luo | G06F 12/0842 |
| | | | 711/103 |
| 2014/0372702 A1* | 12/2014 | Subramanyam | G06F 12/0848 |
| | | | 711/129 |
| 2019/0303476 A1 | 10/2019 | Williamson | |
| 2022/0050722 A1* | 2/2022 | Dugast | G06F 9/4406 |
| 2022/0197796 A1* | 6/2022 | Rumanek | G06F 9/451 |

OTHER PUBLICATIONS

Chen et al., "Caching with Time Domain Buffer Sharing", arXiv:1804.02797v1 [cs.IT] Apr. 9, 2018, 35 pages.

\* cited by examiner

```
# begin buffer pool map
tunable bufferpool_period 1440
tunable sample_percentage 10
tunable total_buffer_size 100
tunable bufferpool_number 10
tunable buffer_calc_version 1
tunable buffer_tune_method 1 buffer pool
bufferpool b1 4k num 5 frame 1G
bufferpool b2 4k num 10 frame 1M
bufferpool b3 8k num 5 frame 2G
......

# types
type 0 database
type 1 tablespace
type 2 table
type 3 index
type 4 blob
type 5 clob
type 6 dlob
type 7 xml
......
```

Type could be defined by user

```
table test1 {        //table type name test1
  id 1                // buffer group id
  # weight 3.000  //weight : sum of sub nodes
  alg balance      // buffer select algorithm
  hash 0              // buffer hash fution
                          //0 show as rjenkins1 bufferpool b1 weight 1.000
  bufferpool b2 weight 1.000
  bufferpool b3 weight 1.000
} table test1 {        //table type name test1
  id 2                // buffer group id
  # weight 3.000  //weight : sum of sub nodes
  alg balance      // buffer select algorithm
  hash 0              // buffer hash fution
                          //0 show as rjenkins1 bufferpool b4 weight 1.000
  bufferpool b5 weight 1.000
  bufferpool b6 weight 1.000
}
```

Hash funtion
0: rjenkins1
1: murmurhash
2: MD5
3: SHA1

FIG. 3A

```
rule workfile1 {
    ruleset 0              // ruleset id
    type sequential        // sequential search
    min_size 1             //backup min
    max_size 10            //backup max
    step take root         //select a root bucket
    step choose firstn 1 type database//select sequential database
    step choose firstn 3 type group      //select 3 buffer pool group
    step choose firstn 1 type bufferpool  // select 1 buffer
    step emit
}
```

FIG. 3D

```
tack(a)
choose
  choose firstn [num] type [bucket-type]
  chooseleaf firstn [num] type [group-type]
    If [num] == 0, choose pool-num-replicas buckets (all available).
    If [num] > 0 && < pool-num-replicas, choose that many buckets.
    If [num] < 0, it means pool-num-replicas - [num].
Emit
```

FIG. 3E

```
Placement Rules Process :
1) take a group, usually a root
2) choosing operations have different select method
a) choose firstn selects number of group-types
b) choose leaf chooses number of sub-group, and continue to
make recursion for the following process for the next level
-if the number is 0, all the sub-group are candidate
-if the number > 0, choose number of the sub-group
-if the number < 0, choose (all-number) of the sub-group
3) emit the result
Operations for choose leaf firstn|num|type|bucket-type] :
a) choose firstn|num|type|bucket-type]
b) choose firstn 1 type osd
```

| id | weight | murmur(c3) | murmur(c3) bcmr3 weight |
|---|---|---|---|
| BP0 | 4 | 0xC35E90CB | 0x2432C |
| BP1 | 4 | 0xA67DE680 | 0x39A00 |
| BP2 | 4 | 0xF9B1B224 | 0x2C890 |
| BP3 | 4 | 0x42454470 | 0x111C0 |
| BP4 | 4 | 0xE950E2F9 | 0x38BE4 |
| BP5 | 4 | 0x8A844538 | 0x114E0 |

FIG. 3H

BUFFER POOL RESOURCE ALLOCATION

BACKGROUND

The present invention relates generally to the field of database management, and more specifically, to appropriately allocating resources to a buffer pool.

A buffer pool is an area of main memory that has been allocated by a database for the purpose of caching table and index data as it is read from disk. Buffer pools permit frequently used data to be accessed directly from memory, which can speed up processing. On dedicated servers, buffer pools can sometimes take up as much as 80% of physical memory. In many cases, the size of the buffer pool is correlated to a hit ratio with respect to the corresponding cache; a hit ratio, as used herein, is a ratio of the cache hits compared to a total number of received content requests. Buffer pools can greatly impact the performance of a database.

SUMMARY

As disclosed herein, a computer implemented method for managing buffer pool usage includes identifying a database comprising one or more buffer pools and a set of database objects, adding a virtual layer between the set of database objects and the one or more buffer pools, wherein the virtual layer is configured to manage buffer pool resource utilization, managing, using the added virtual layer, buffer pool resource utilization with respect to the set of database objects, wherein the managing comprises defining buffer pool usage corresponding to the set of database objects, dynamically mapping database objects to the buffer pools based, at least in part, on the defined buffer pool usage, analyzing, by one or more processors, queues to identify updated buffer pool usage, and adjusting database object allocation according to the identified updated resource usage. A computer program product and computer system corresponding to the method are also disclosed.

BRIEF DESCRIPTION OF THE DRAWINGS

FIG. 3A depicts a set of buffer pool virtual structure definitions in accordance with an embodiment of the present invention;

FIG. 3D depicts a rule workfile dictating a set of placement rules for choosing which buffer pool, or buffer pool resource, is chosen when a data object is being cached or stored in accordance with an embodiment of the present invention;

FIG. 3E depicts a selection algorithm for determining selection parameters in accordance with an embodiment of the present invention;

FIG. 3F depicts a placement algorithm for determining a set of placement rules corresponding to the selection algorithm in accordance with an embodiment of the present invention;

FIG. 3H depicts a hash table in accordance with an embodiment of the present invention;

DETAILED DESCRIPTION

Application systems may have thousands of database objects, making it cumbersome for a database administrator to tune buffer pool performance. In general, a database has a fixed number of buffer pools. In at least some embodiments, 4 KB page buffer pools are named BPK0 through BPK49, 8 KB page buffer pools are named BP8K0 through BP8K9, 16 KB page buffer pools are named BP16K0 through BP16K9, and 32 KB page buffer pools are named BP32K through BP32K9. Buffer pool usage is typically defined during database objects building. The methods as disclosed herein enable dynamic optimization of buffer pool resource usage. The addition of a virtual layer between one or more buffer pools and one or more databases contributing database objects enables increased security, while also enabling increased capacity for dynamically managing buffer pool resource allocation.

Figure 1:
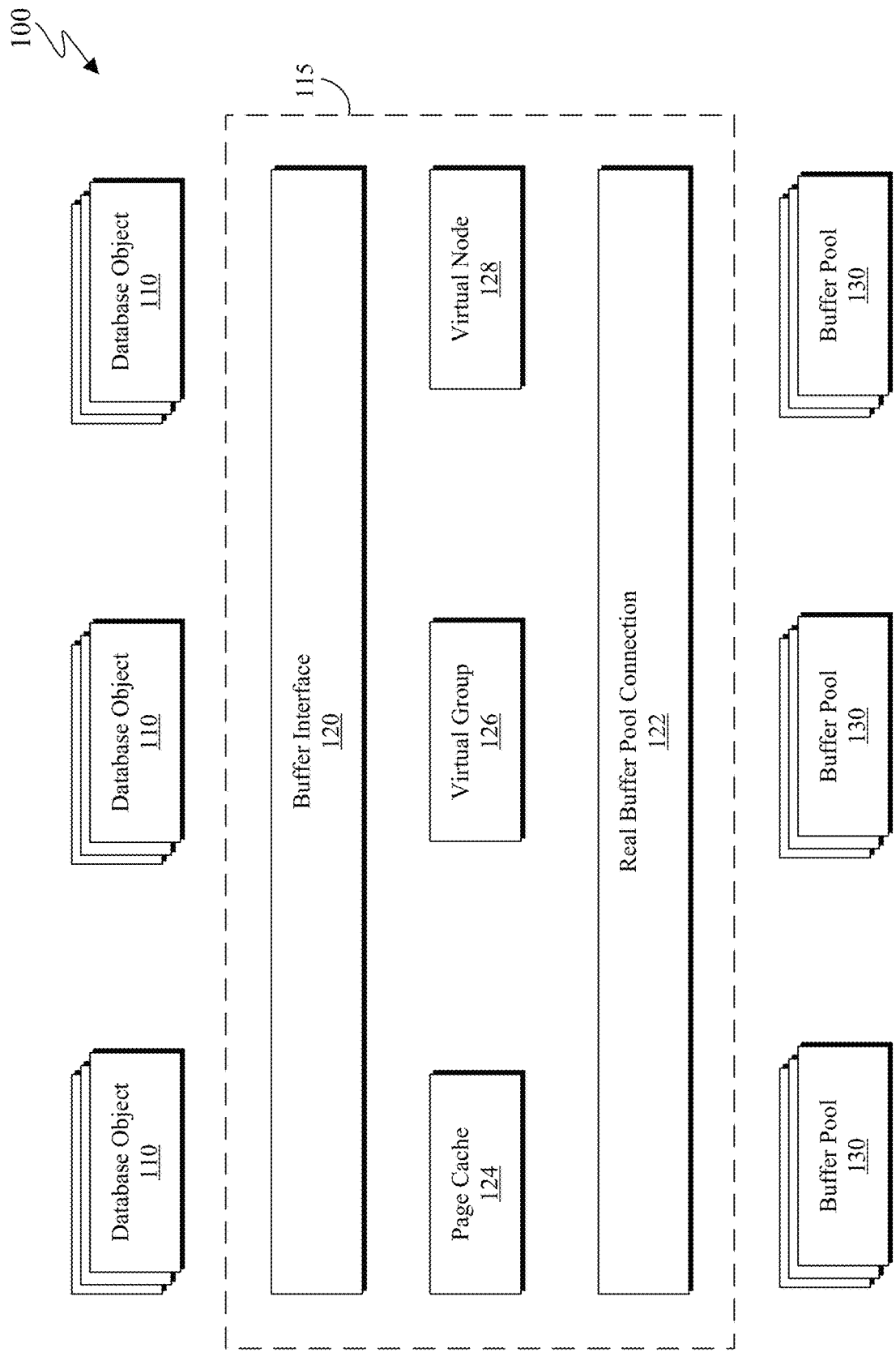
FIG. 1 is a block diagram depicting a database management system in accordance with at least one embodiment of the present invention.

FIG. 1 depicts a block diagram of components of a database management system 100 in accordance with at least one embodiment of the present invention. As depicted, database management system 100 includes database objects 110, buffer pool manager 115, and buffer pools 130. It should be appreciated that while database management system 100 includes a fixed number of buffer pools 130, any number of buffer pools may be appropriate for inclusion in additional embodiments.

Database objects 110 may each be any defined object in a database that is used to store or reference data. Database objects 110 may include, but are not limited to, tables, views, clusters, sequences, indexes, and/or synonyms. In general, database objects 110 correspond to any object through which data is available to buffer pool manager 115 and buffer pools 130.

Buffer pool manager 115 may be configured to manage data access and storage via buffer pools 130. As depicted, buffer pool manager 115 may include buffer interface 120, real buffer pool connection 122, page cache 124, virtual group 126, and virtual node 128.

Buffer interface 120 may enable an object to expose information about its underlying buffer; in other words, buffer interface 120 corresponds to a structure or protocol which enables a user or any other actor to query or otherwise request underlying buffer information from a buffer pool 130 or any object stored within said buffer pool 130. Buffer interface 120 may be configured to receive queries or requests for information corresponding to objects cached in buffer pools 130, or a buffer pool of buffer pools 130 itself, and may additionally be configured to provide said information. In general, buffer interface 120 may be an interface via which a user or other actor can interact with buffer pools 130 and data stored therein.

Page cache 124 may include cached data corresponding to recently accessed data pages, such as pages stored on at least one database object 110. When a row of data in a table is first accessed, the database manager caches a page that contains said data, creating page cache 124, and places page cache 124 into a buffer pool 130. Page cache 124 persists in the buffer pool 130 until the corresponding database is shut down, or until the space occupied by the page is required by a newly accessed page.

Real buffer pool connection 122 may include any connection protocol via which buffer pool manager 115 is connected to buffer pools 130. In at least some embodiments in which buffer pool 130 and buffer interface 115 are co-located, real buffer pool connection 122 corresponds to a local connection via which data transfer can occur between database object 110, buffer pool manager 115, and buffer pools 130. In embodiments where buffer interface 115 is implemented separately from buffer pools 130, real buffer pool connection 122 may correspond to a network Virtual group 126 may be configured to maintain virtual group structures corresponding to any virtually implemented buffer pools; in other words, virtual group 126 may comprise protocols, access information, and any other mechanisms necessary for managing, monitoring, and manipulating any buffer pool(s) of buffer pools 130 which may be implemented virtually. Similarly, virtual node 128 may be a name defined on the local instance of buffer pool manager 115 configured to identify a remote instance of buffer pool manager 115. Virtual node 128 may be identifying information enabling a user or other actor to connect to buffer pool manager 115 on a remote instance, or identifying information enabling an application to access buffer pool manager 115 via a remote instance. In at least some embodiments, virtual group 126 comprises various buffer pool structure definitions, including (but not limited to) buffer pool period, sample percentage, total buffer size, buffer calculation version, buffer tune method, buffer pool weights, data types, and table types.

Buffer pools 130 may each correspond to areas of main memory that have been allocated by a database manager. In at least some embodiments, buffer pools 130 are configured to cache data as it is accessed or read from disk.

Figure 2:
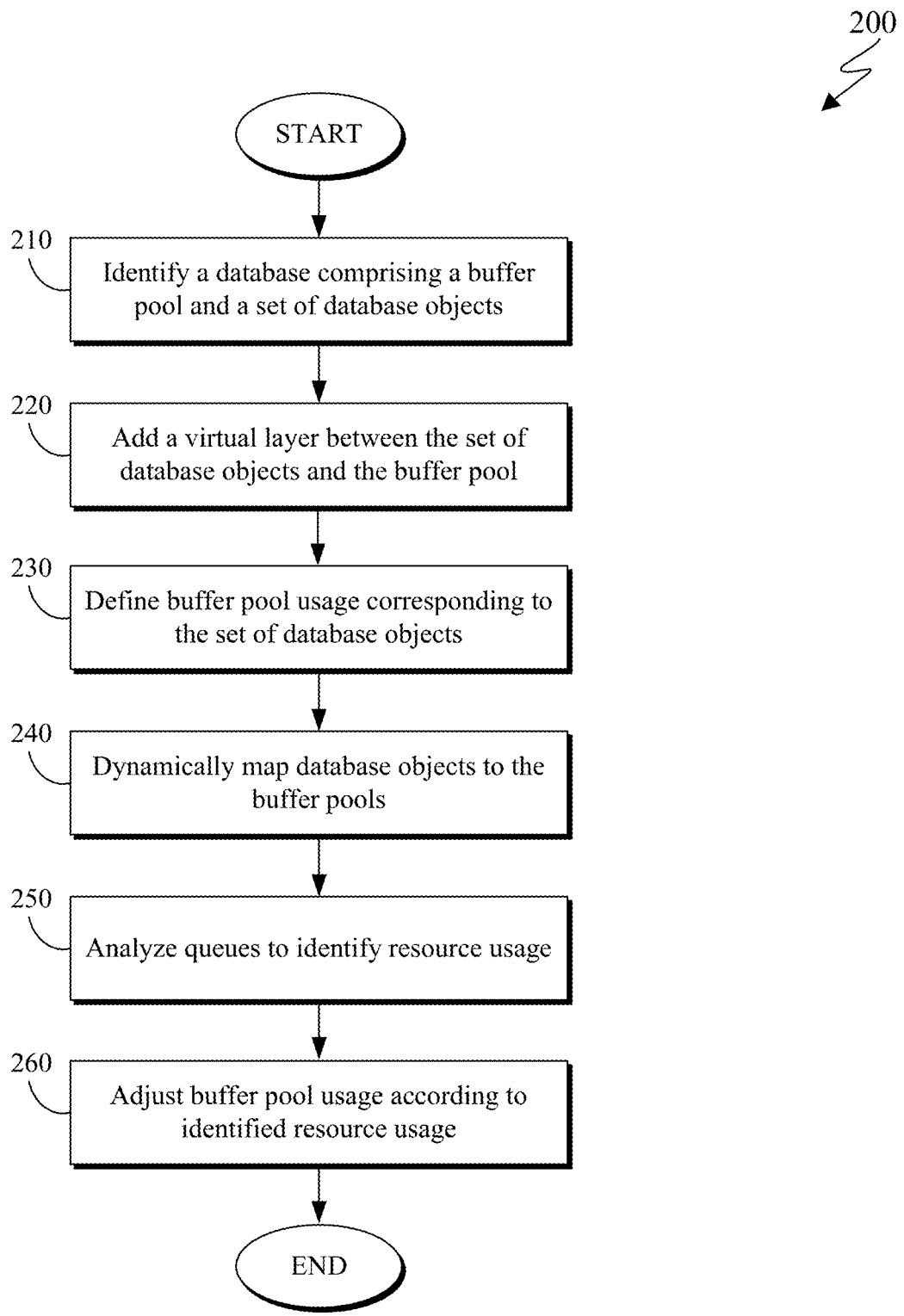
FIG. 2 is a flowchart depicting a database management method in accordance with at least one embodiment of the present invention.

FIG. 2 is a flowchart depicting a buffer pool management method 200 in accordance with at least one embodiment of the present invention. As depicted, buffer pool management method 200 includes identifying (210) a database comprising a buffer pool and a set of database objects, adding (220) a virtual layer between the set of database objects and the buffer pool, defining (230) buffer pool usage corresponding to the set of database objects, dynamically mapping (240) database objects to the buffer pools, analyzing (250) queues to identify resource usage, and adjusting (260) buffer pool usage according to identified resource usage. Buffer pool management method 200 may enable improved resource utilization for buffer pools.

Identifying (210) a database comprising a buffer pool and a set of database objects may include identifying a database of interest and one or more corresponding buffer pools and database objects. In at least some embodiments, identifying (210) a database of interest comprises querying said database to request identifying information regarding one or more corresponding buffer pools. Similarly, identifying (210) a database of interest may include querying said database to request identifying information regarding one or more corresponding database objects. In at least some embodiments, identifying (210) a database comprising a buffer pool and a set of database objects includes identifying one or more virtual implementations corresponding to the database's buffer pools. Similarly, identifying (210) a database comprising a buffer pool and a set of database objects may additionally include identifying one or more virtual implementations corresponding to the database's database objects.

Adding (220) a virtual layer between the set of database objects and the buffer pool may include adding a virtualized buffer pool management layer, or buffer pool manager, configured to manage buffer pool resource utilization. In at least some embodiments, the added virtual layer includes a buffer interface configured to enable and manage connection between database objects and the buffer pool(s). Adding (220) a virtual layer between the set of database objects and the buffer pool may additionally include defining a set of buffer pool structure variables. In at least some embodiments, the set of buffer pool structure variables may include (but are not limited to) any of: buffer pool period, sample percentage, total buffer size, buffer calculation version, buffer tune method, buffer pool weights, data types, and table types. In at least some embodiments, the set of buffer pool structure variables may be set by a user interacting via the buffer interface. In yet other embodiments, the variables may be set or altered automatically based on observations with respect to ongoing management of the buffer pool; for example, in an embodiment where a high percentage of the buffer pool is being utilized and there may exist some concern that additional buffer pool space may ultimately be necessary at some point, additional buffer pool space may be added, and the total buffer size variable may be updated to reflect the increased buffer size. In at least some embodiments, the added virtual layer includes a page cache configured to generate or create a cached page including data to be stored in the corresponding buffer pool. In at least some embodiments, the added virtual layer includes a virtual group indicating buffer pool structure or protocols dictating operation of the corresponding buffer pool. The added virtual layer may additionally include a virtual node indicating remote access information as available. In at least some embodiments, the added virtual layer is configured to define (230) buffer pool usage corresponding to the set of database objects, dynamically map (240) database objects to the buffer pools, analyze (250) queues to identify resource usage, and adjust (260) buffer pool usage according to identified resource usage; in other words, the added virtual layer may be configured to execute the remaining steps of buffer pool management method 200.

Defining (230) buffer pool usage corresponding to the set of database objects may include determining how much buffer pool space is available according to current utilization. In at least some embodiments, defining (230) buffer pool usage includes enabling a user to define database resource usage with respect to the buffer pool and the set of database objects. In at least some embodiments, defining (230) buffer pool usage may include establishing a hierarchy of database resources available for use by the buffer pool. Defining (230) buffer pool usage corresponding to the set of database objects includes analyzing existing or current buffer pool resource implementations and mapping the set of database objects to the buffer pool resources according to the current implementations. In at least some embodiments, defining (230) buffer pool usage may include establishing thresholds with respect to the buffer pool and corresponding resources. In such embodiments, the established thresholds may correspond to optimal utilization levels. For example, the established threshold for a subject resource may indicate an optimization level above which said resource's performance begins to diminish; in such embodiments, buffer pool usage may be defined to keep such a resource's utilization level below the threshold such that it performs at a relatively high level. In some embodiments, defining (230) buffer pool usage may include establishing a set of rules corresponding to the buffer pool usage. For example, defining (230) buffer pool usage may include establishing placement rules, which indicate a set of rules for determining where a data object will be stored with respect to the resources utilized by the buffer pool.

Dynamically mapping (240) database objects to the buffer pools may include assigning the database objects to the buffer pools according to the protocols as indicated or determined by the added virtual layer. In at least some embodiments, dynamically mapping (240) database objects to the buffer pools includes utilizing a k-nearest neighbors (KNN) algorithm to identify a classification for the database objects based on historical buffer pool placement with respect to past database objects. In general, in at least some embodiments, database objects may be mapped to buffer pools according to which buffer pools similar past database objects have been mapped to. FIGS. 3A-3K depict an example buffer pool placement with respect to an embodiment of the present invention.

Analyzing (250) queues to identify resource usage may include monitoring buffer pool queues to determine how heavily each resource of the buffer pool or buffer pools is being utilized. Notably, analyzing (250) queues to identify resource usage may include determining how current resource usage compares to resource usage thresholds to determine whether any resources are operating near or above threshold capacity for utilization. In at least some embodiments, analyzing (250) queues to identify resource usage includes flagging resources or buffer pools which are operating near, at, or above threshold levels. Analyzing (250) queues to identify resource usage may include querying buffer pool resources for available utilization data.

Adjusting (260) buffer pool usage according to identified resource usage may include managing database object assignment to buffer pools according to the identified resource usage. In at least some embodiments, adjusting (260) buffer pool usage includes moving one or more database objects from a current buffer pool resource to a different buffer pool resource responsive to determining either that the current buffer pool resource is too close to (or over) capacity, or determining that moving the database objects in this manner will yield a more balanced workload for the collective buffer pool resources. In at least some embodiments, adjusting (260) buffer pool usage includes managing a queue of yet-to-be-assigned database objects according to the identified resource usage. In such embodiments, adjusting (260) buffer pool usage may include selecting a next resource to be utilized according to the current resource utilization data. Adjusting (260) buffer pool usage may additionally include reconfiguring current buffer pool resource utilization to accommodate pending or queued buffer pool requests; for example, if a large data object is queued to be cached in the buffer pool, but none of the resources in the buffer pool currently have space to accommodate said large data object, smaller data objects currently cached in the buffer pool may be moved from resource to resource to clear up a large enough space for the large data object on a single resource. In at least some embodiments, adjusting (260) buffer pool usage according to the identified resource usage includes enabling a user, either via an interface or otherwise, to adjust buffer pool usage according to the identified resource usage. In general, adjusting (260) buffer pool usage according to the identified resource usage refers to any actions taken with respect to the buffer pool usage responsive to conditions revealed by current resource utilization data.

Figure 3B:
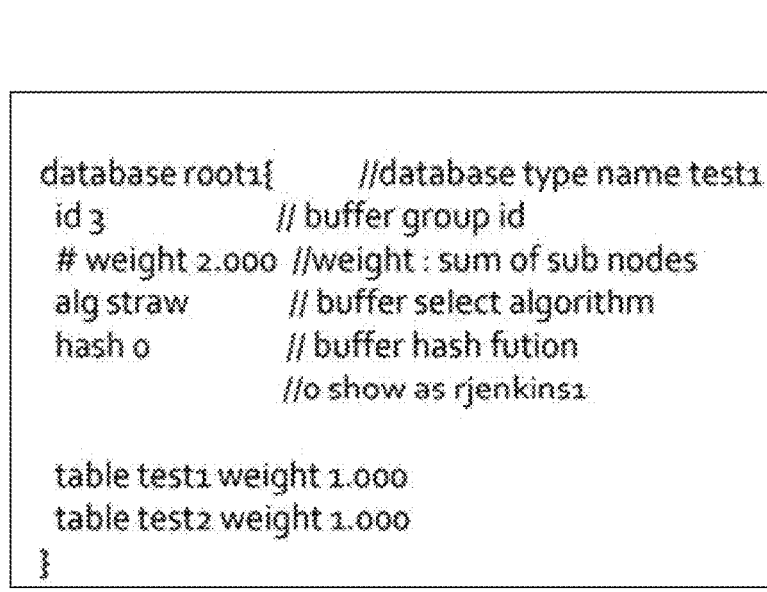
FIG. 3B depicts a set of buffer pool virtual structure definitions in accordance with an embodiment of the present invention.

FIG. 3A depicts a set of buffer pool virtual structure definitions 300 in accordance with an embodiment of the present invention. As depicted, the set of buffer pool virtual structure definitions 300 defines such variables and parameters as: buffer pool period, sample, percentage, total buffer size, buffer pool number, buffer calculation version, buffer tune method. The set of buffer pool virtual structure definitions 300 additionally includes data object types, such as database (type 0), tablespace (type 1), table (type 2), index, (type 3), blob (type 4), clob (type 5), dlob (type 6), and xml (type 7). As depicted, the set of buffer pool virtual structure definitions additionally includes buffer pool weights, as well as table test definitions. Similarly, FIG. 3B depicts a set of buffer pool virtual structure definitions 302 in accordance with an embodiment of the present invention. As depicted, the set of buffer pool virtual structure definitions 302 includes a database root definition, as well as a database weight indication and table test weights.

Figure 3C:
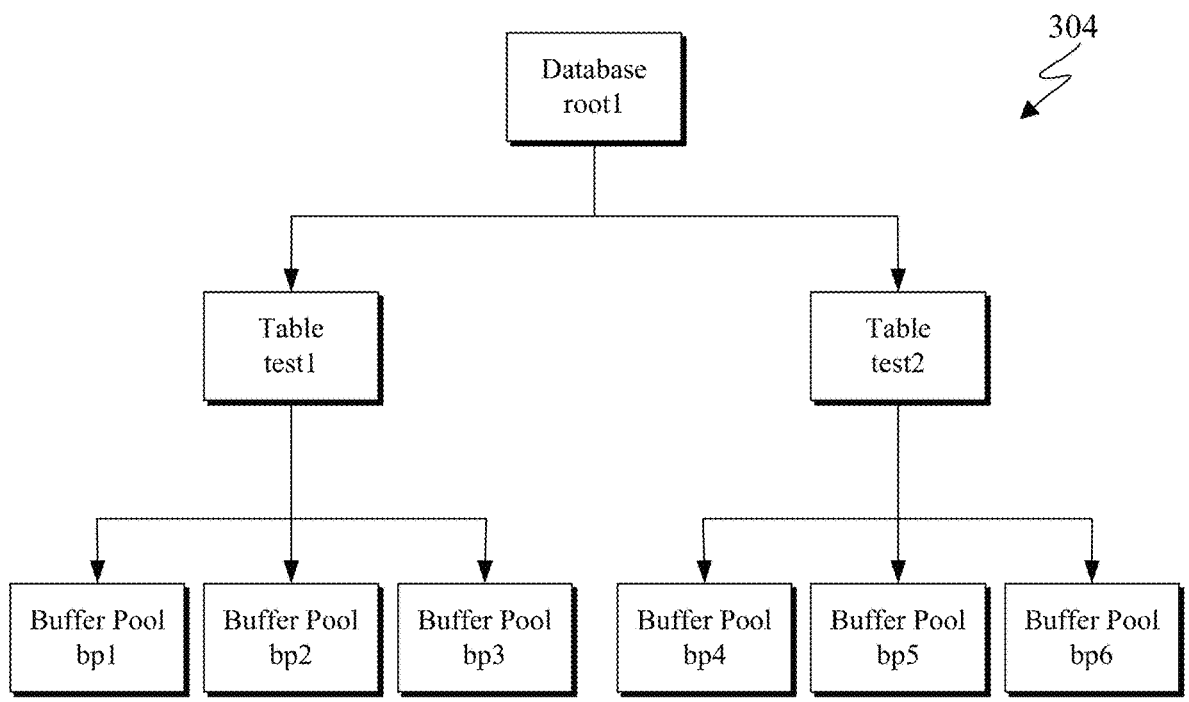
FIG. 3C depicts a data tree indicating data flow in accordance with an embodiment of the present invention.

FIG. 3C depicts a data tree 304 indicating data flow. As depicted, data tree 304 includes a database (root1) providing data to two test tables (test1 and test2). The data from the first test table, test1, is cached using buffer pool bp1, buffer pool bp2, and buffer pool bp3. The data from the second test table, test2, is cached using buffer pool bp4, buffer pool bp5, and buffer pool bp6. It should be appreciated that, though FIG. 3C depicts data allocation with respect to different buffer pools, data may be separately cached similarly with respect to distinct buffer pool resources within a single buffer pool, or multiple buffer pools.

FIG. 3D depicts a rule workfile 306 dictating a set of placement rules for choosing which buffer pool, or buffer pool resource, is chosen when a data object is being cached or stored. With respect to the depicted embodiment, based on the rule workfile 306, a placement is chosen according to the parameters as described. The rule workfile 306 indicates a ruleset ID, a search type, a backup minimum, a backup maximum, and a series of steps including selecting a root bucket, selecting a sequential database, selecting a three buffer pool group, and selecting a buffer pool from the group. With respect to FIG. 2 and buffer pool management method 200, a rule file such as rule workfile 306 may be created with respect to adding (220) a virtual layer between the set of database objects and the buffer pool, such that rule workfile 306 provides guidance for placing a data object. It should be appreciated that a rule file such as rule workfile 306 may be created to dictate both initial placement of a database object, as well as reassignment of a database object as database objects are mapped and as buffer pool usage is adjusted. In other words, rule workfile 306 may additionally be consulted when dynamically mapping (240) database objects to the buffer pools and when adjusting (260) buffer pool usage with respect to FIG. 2 and buffer pool management method 2.

FIG. 3E depicts a selection algorithm 308 for determining selection parameters. Similarly, FIG. 3F depicts a placement algorithm 310 for determining a set of placement rules corresponding to the selection algorithm 308. With respect to FIG. 2 and buffer pool management method 200, a selection algorithm such as selection algorithm 308 may be leveraged with respect to dynamically mapping (240) database objects to buffer pools and adjusting (260) buffer pool usage. A selection algorithm such as selection algorithm 308 may determine one or more buffer pools or buffer pool resources which are selected for placement. Similarly, with respect to FIG. 2 and buffer pool management method 200, a placement algorithm such as placement algorithm 310 may be leveraged with respect to dynamically mapping (240) database objects to buffer pools and adjusting (260) buffer pool usage. A placement algorithm such as placement algorithm 310 may determine one or more buffer pools or buffer pool resources (of the buffer pools or buffer pool resources selected by selection algorithm 308) on which a database object will be cached.

Figure 3G:
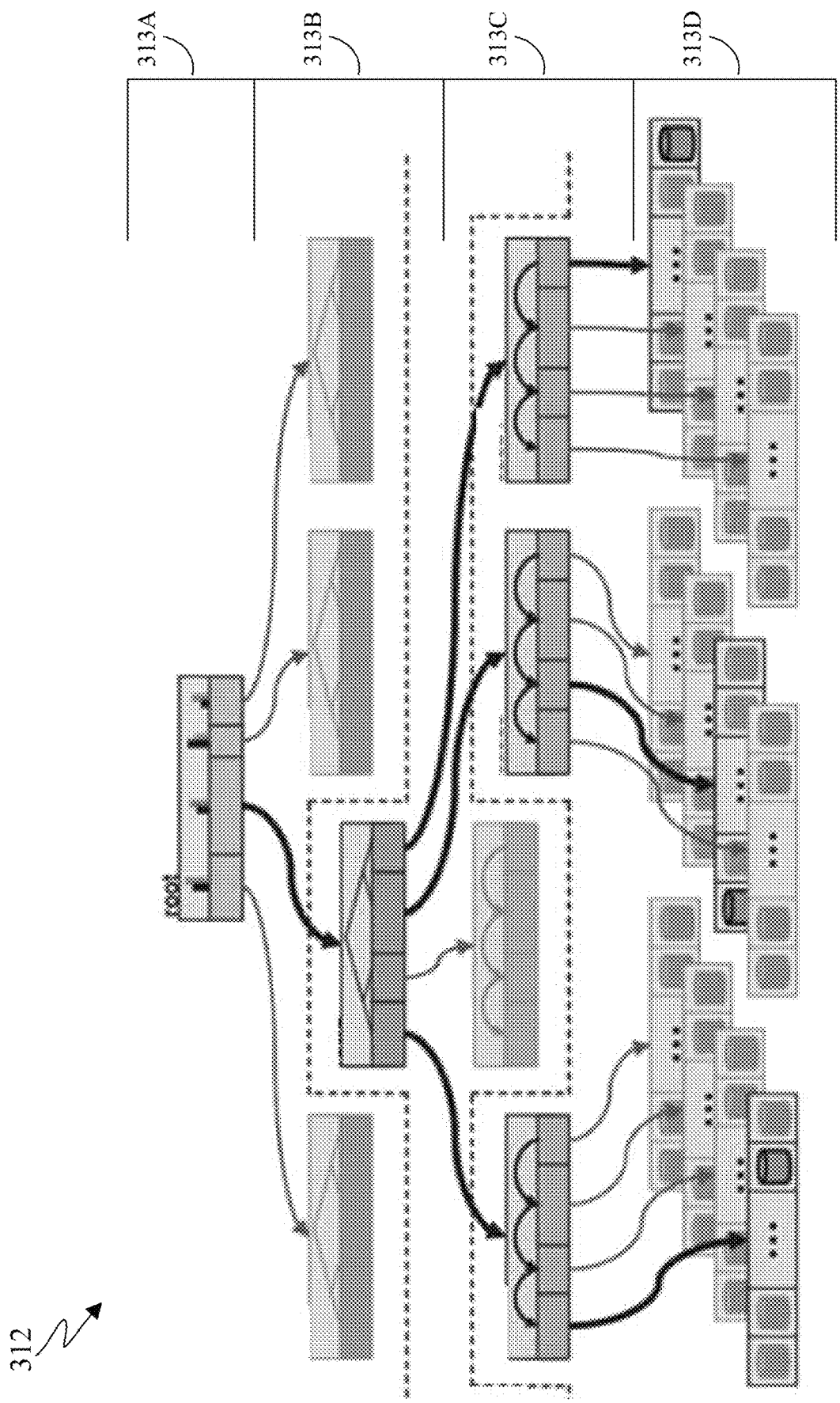
FIG. 3G is a block diagram depicting a series of "buckets" for defining buffer pool allocation in accordance with an embodiment of the present invention.

FIG. 3G is a block diagram 312 depicting a series of "buckets" for defining buffer pool allocation. As depicted, block diagram 312 includes a first top layer (313A) including a single root bucket which splits into four databases in the database layer 313B below, from which one database is chosen. As depicted, each database contains 4 groups in the group layer 313C, from which 3 are chosen, as depicted. Each group contains 4 buffer pools in the buffer pool layer 313D, from which one is chosen, providing the final resource or buffer to be used. The selections depicted with respect to FIG. 3G are defined by the rule workfile 306, the selection algorithm 308, and the placement algorithm 310.

FIG. 3H depicts a hash table 314 in accordance with an embodiment of the present invention. As depicted, the hash table 314 includes a buffer pool or resource ID, a corresponding weight, a murmurhash, and an aggregation of the murmurhash and the corresponding weight for each buffer pool or resource ID. Based on the results of the table, the buffer pool distribution may be balanced according to the following equation:

$$c(r,x) = \max_i(f(w_i)\text{hash}(x,r,i)) \text{ wherein}$$
$$\max\_x = -1$$
$$\max\_item = -1, \text{ wherein}$$
for each item:
$\quad x$ = random value from 0 to 65535,
$\quad x^*$ = scaling factor,
$\quad$ if $x > \max\_x$:
$\quad\quad \max\_x = x$
$\quad\quad \max\_item = item$
$\quad$ return item In plain terms, for a value r=0, the above algorithm chooses a buffer pool with a max of (CRUSH_HASH & 0xFFFF)*weight as 0X39A00 as a first buffer pool, and then sets r=1 and uses the same calculation to choose another buffer pool with respect to which balancing can occur. If the same buffer pool is chosen according to the r=1 calculation, the item is recalculated recursively by adding 1 to r until a second buffer pool is chosen. With respect to FIG. 2 and buffer pool management method 200, a hash table such as hash table 314 may be leveraged with respect to defining (230) buffer pool usage corresponding to the set of database objects and subsequently dynamically mapping (240) database objects to the buffer pools. A hash table such as hash table 314 may be used by a virtual layer to determine current buffer pool utilizations, and said determinations may subsequently be utilized when mapping database objects to said buffer pools.

Figure 3I:
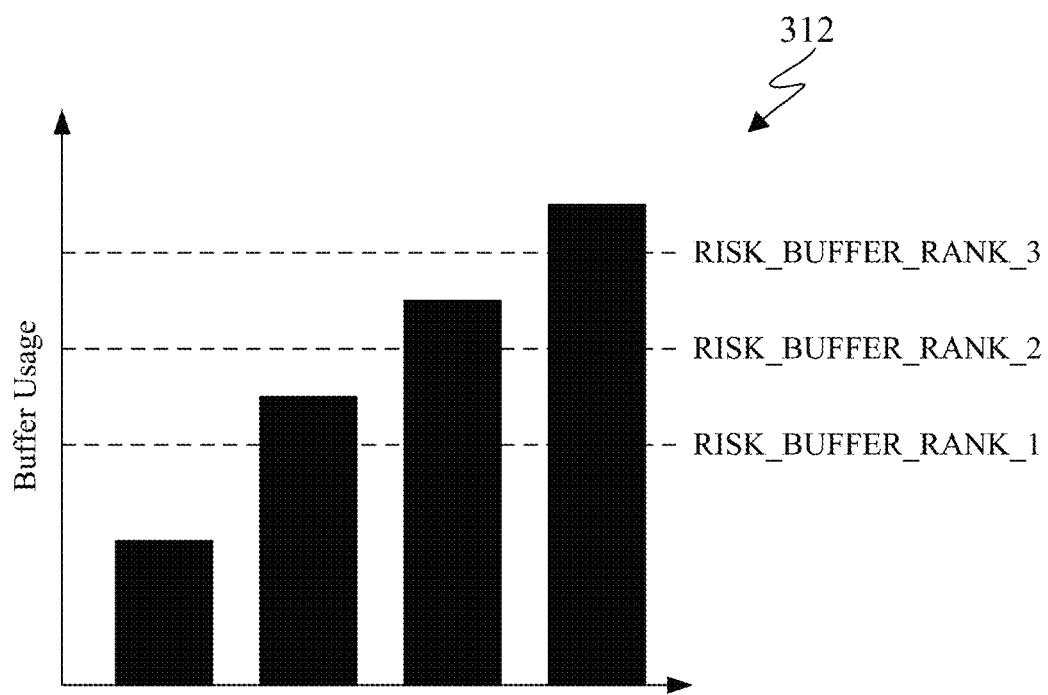
FIG. 3I depicts a buffer risk rank chart in accordance with an embodiment of the present invention.

FIG. 3I depicts a buffer risk rank chart 312 in accordance with an embodiment of the present invention. As depicted, FIG. 3I depicts buffer usage with respect to four buffer pools, as well as three buffer usage levels corresponding to identified risk levels, displayed on the right as "RISK_BUF-FER_RANK_1", "RISK_BUFFER_RANK_2", and "RISK_BUFFER_RANK_3". Each risk level corresponds to a buffer usage level that has been identified as problematic in some capacity; for example, RISK_BUFFER_RANK_1 may correspond to a usage level at which the buffer pool is considered nearly at capacity (i.e., may not be able to accept all additional requests due to availability), RISK_BUFFER_RANK_2 may correspond to a usage level at which the buffer pool begins to show decreased performance (i.e., responses are slower, etc.), and RISK_BUFFER_RANK_3 may correspond to a usage level at which the buffer pool is entirely utilized and likely overtaxed. It should be appreciated that these are just examples of risk levels with respect to buffer pool usage, and these examples are not intended to be exhaustive. Additionally, it should be appreciated that the example risk levels may appear in an alternate order. For example, the buffer pool may begin exhibiting performance issues before it reaches a "near capacity" threshold; with respect to the depicted embodiment, this would correspond to "RISK_BUFFER_RANK_2" occurring before "RISK_BUFFER_RANK_1" as defined. In general, the buffer usage risk levels can be identified based on historical record analytics or customer input data. In at least some embodiments, the buffer usage risk levels may be determined according to previously executed experiments, wherein the capacities of the buffer pools and corresponding resources are tested and recorded.

Figure 3J:
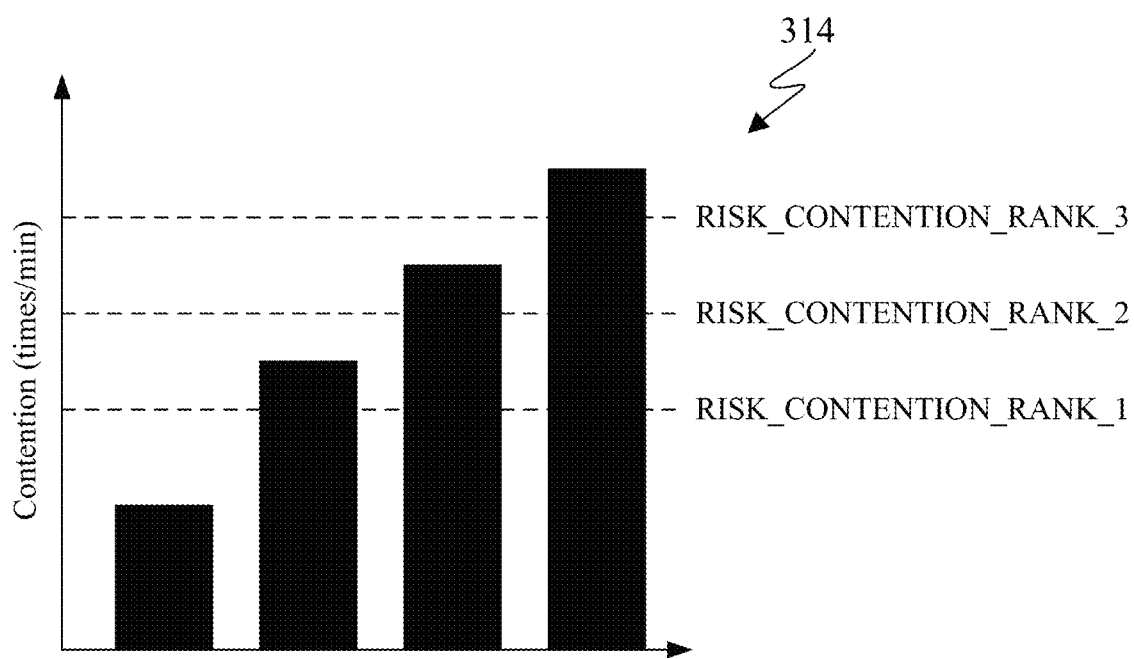
FIG. 3J depicts a contention risk rank chart in accordance with an embodiment of the present invention.

FIG. 3J depicts a contention risk rank chart 314 in accordance with an embodiment of the present invention. As depicted, contention risk chart 314 depicts contention with respect to four buffer pools, as well as three contention levels corresponding to identified risk levels, displayed on the right as "RISK_CONTENTION_RANK_1", "RISK_CONTENTION_RANK_2", and "RISK_CONTENTION_RANK_3". Each risk level corresponds to a contention level that has been identified as problematic in some capacity; for example, RISK_CONTENTION_RANK_1 may correspond to a contention level at which the buffer pool is considered to be nearly handling as many concurrent accesses as it can (i.e., the buffer pool may not have the resources necessary to handle many additional concurrent accesses), RISK_CONTENTION_RANK_2 may correspond to a contention level at which the buffer pool begins to exhibit decreased performance (i.e., responses are slower, etc.), and RISK_BUFFER_RANK_3 may correspond to a usage level at which the buffer pool is entirely at capacity and likely overtaxed. It should be appreciated that these are just examples of risk levels with respect to buffer pool contention, and these examples are not intended to be exhaustive. Additionally, it should be appreciated that the example risk levels may occur in an alternate order. For example, the buffer pool may begin exhibiting performance issues before it reaches a "near capacity" threshold; with respect to the depicted embodiment, this would correspond to "RISK_CONTENTION_RANK_2" occurring before "RISK_CONTENTION_RANK_1" as defined. In general, the contention risk levels can be identified based on historical record analytics or customer input data. In at least some embodiments, the contention risk levels may be determined according to previously executed experiments, wherein the capacities of the buffer pools and corresponding resources are tested and recorded.

Figure 3K:
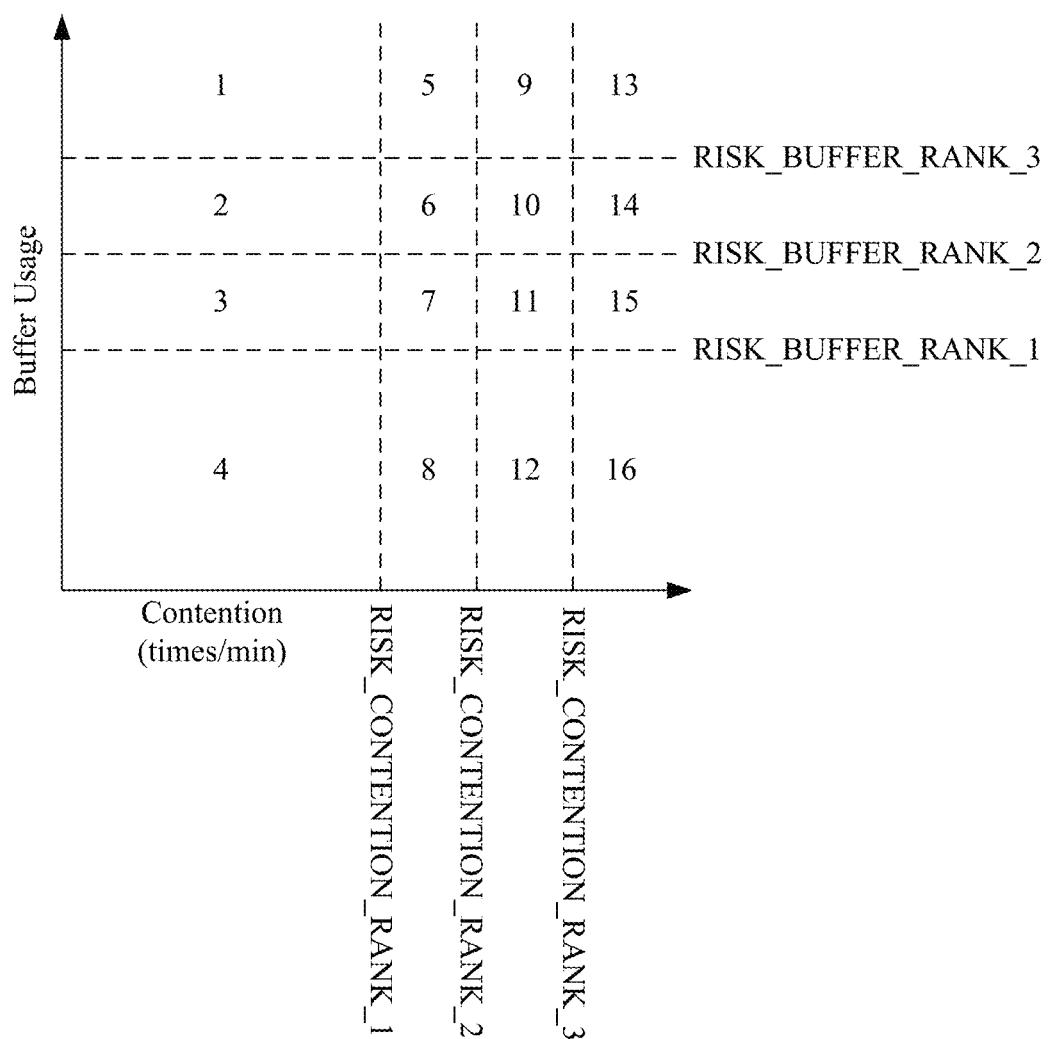
FIG. 3K depicts an aggregated risk chart in accordance with an embodiment of the present invention.

FIG. 3K depicts an aggregated risk chart 316 in accordance with an embodiment of the present invention. As depicted, aggregated risk chart 316 is an aggregation of the buffer usage risk data described with respect to FIG. 3I, and the buffer contention risk data described with respect to FIG.

3J. As depicted, the various "zones" created by the intersection of the contention risk thresholds (as indicated on the x-axis) and the buffer usage risk thresholds (as indicated on the y-axis) are numbered. These zones are described further with respect to FIG. 3L.

Figure 3L:
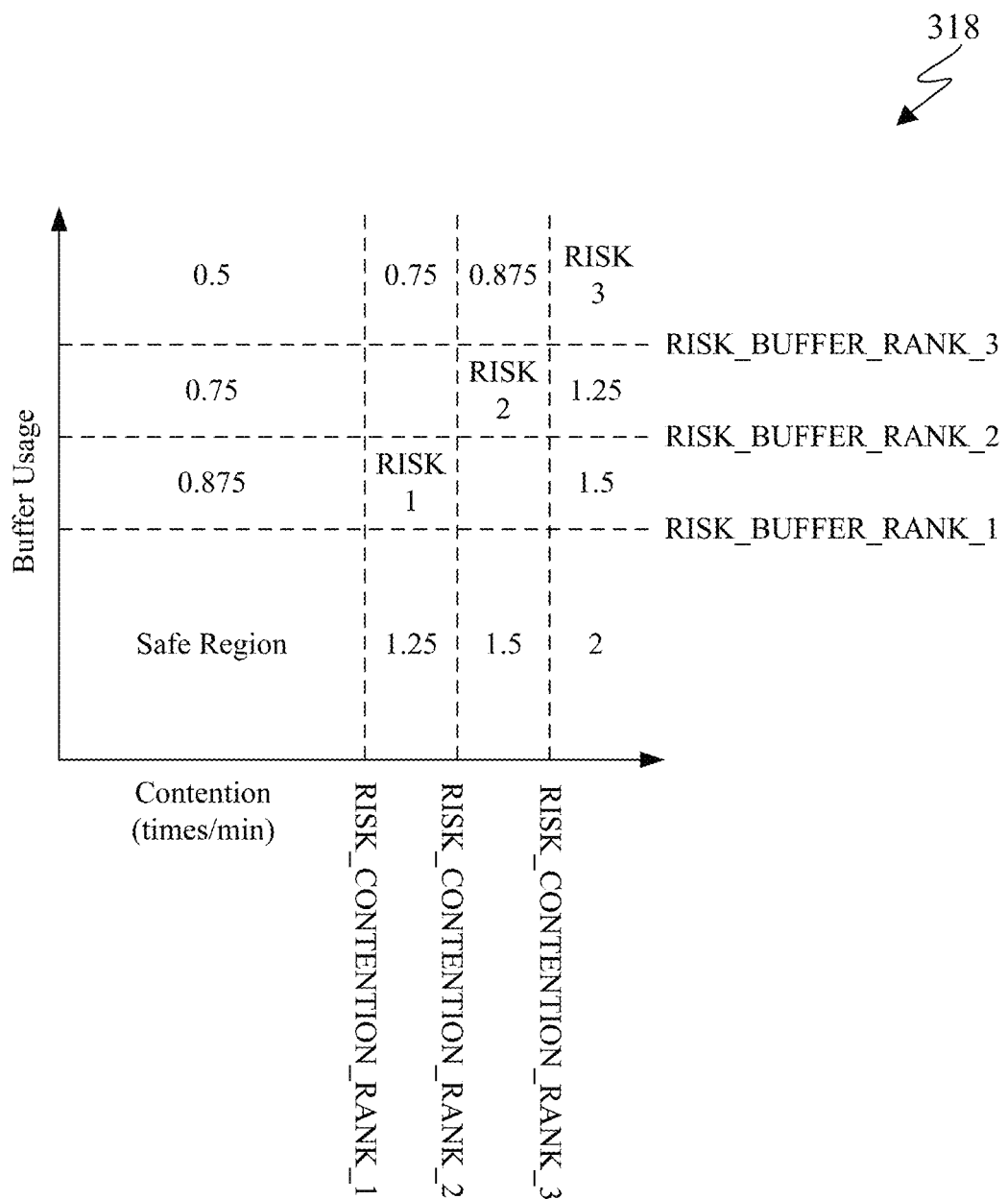
FIG. 3L depicts a weighted aggregated risk chart in accordance with an embodiment of the present invention.

FIG. 3L depicts a weighted aggregated risk chart 318 in accordance with an embodiment of the present invention. As depicted, weighted aggregated risk chart 318 corresponds to aggregated risk chart 316, with weightings assigned to the zones as defined in aggregated risk chart 316. The various weightings for these zones may be user defined such that the user is able to manipulate which risk combinations would be weighted the most heavily (i.e., which combination of risk factors would be most concerning/most desirable to be avoided) as well as which risk combinations would be weighted least heavily (i.e., which combination of risk factors may pose the least trouble to the system's performance). For example, a user may issue a low weighting to the risk zone corresponding to RISK_CONTENTION_RANK_1 and RISK_BUFFER_RANK_3, depicted as zone 1 with respect to 3K, because the conditions corresponding to these risk levels are unlikely to affect the functioning of the system in one embodiment. In at least some embodiments, the weighting of the various sections of weighted aggregated risk chart 318 may be automated such that the system monitors user input historically with respect to the weights assigned to certain systems and system types, and eventually, once enough historical data is present, recognizes similar conditions and applies the weightings automatically accordingly. Enabling configurable weighting of risk levels in this manner enables the system, and by extension the user, to dynamically adjust the "importance" of certain risk factors with respect to assigning buffer pool workloads, such that said risk factors will reflect conditions of a current buffer pool allocation.

Generally, with respect to FIG. 2 and buffer pool management method 200, FIG. 3I, FIG. 3J, FIG. 3K, and FIG. 3L correspond to analyzing (250) queues to identify resource usage, and actions taken subsequent to the analysis correspond to adjusting (260) buffer pool usage according to identified resource usage. With respect to FIG. 3L, the weightings associated with the sections of weighted aggregated risk chart 318 may be defined with respect to defining (230) buffer pool usage with respect to FIG. 2 and buffer pool management method 200. The user may define weights corresponding to each risk level indicated with respect to FIG. 3L, such that the weight of each zone of weighted aggregated risk chart 318 depends on the contributing risk levels. With respect to FIG. 2 and buffer pool management method 200, adjustments made to buffer pool allocation and database object distribution according to a weighted aggregated risk chart such as weighted aggregated risk chart 318 correspond to adjusting (260) buffer pool usage according to the identified resource usage.

Figure 4:
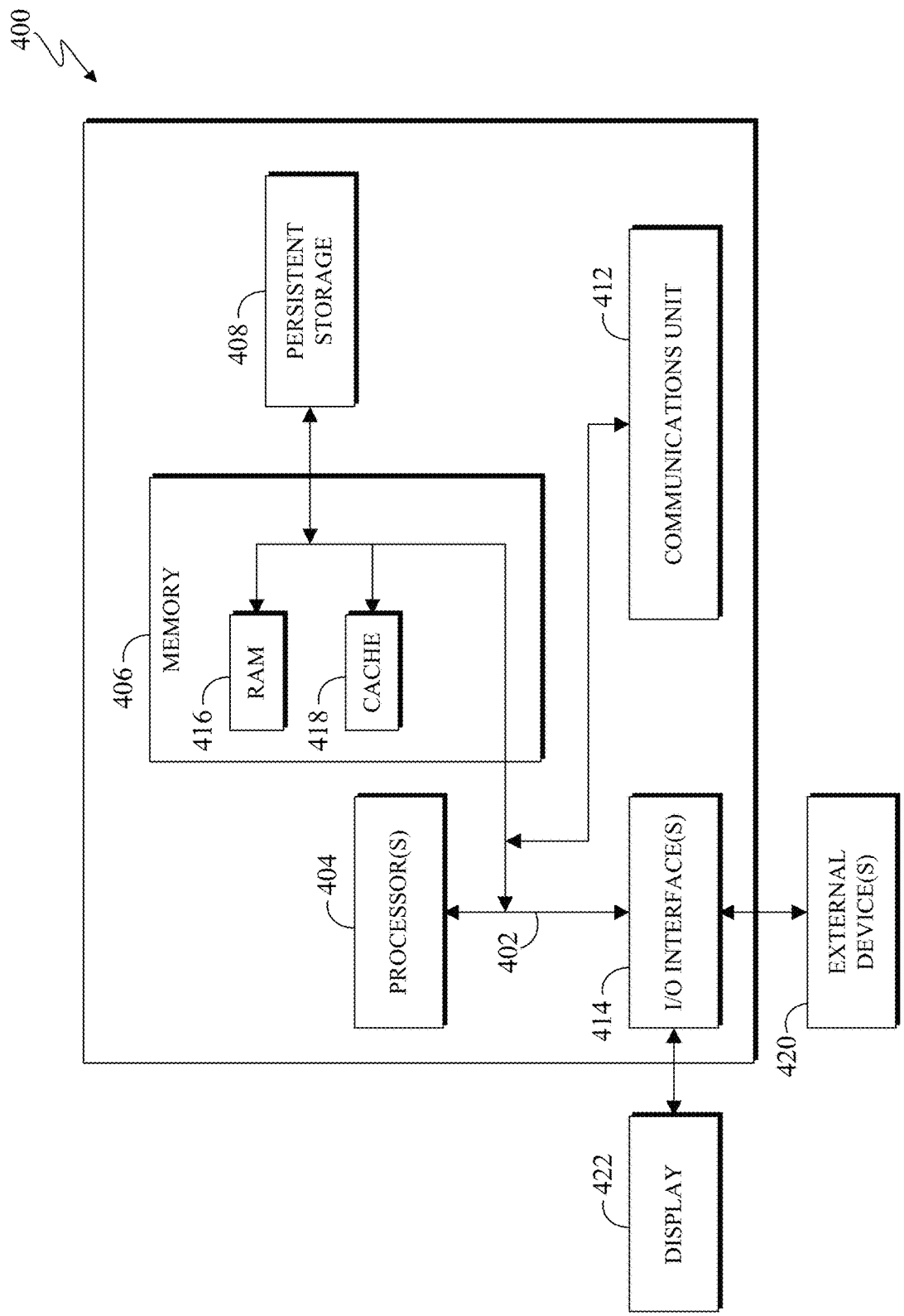
FIG. 4 is a block diagram of components of a computing system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
identifying, by one or more processors, a database comprising one or more buffer pools and a set of database objects;
adding, by one or more processors, a virtual layer between the set of database objects and the one or more buffer pools, wherein the virtual layer is configured to manage buffer pool resource utilization;
managing, by one or more processors, using the added virtual layer, buffer pool resource utilization with respect to the set of database objects, wherein the managing comprises:
defining, by one or more processors, buffer pool usage corresponding to the set of database objects;
dynamically mapping, by one or more processors, database objects to the buffer pools based, at least in part, on the defined buffer pool usage;
analyzing, by one or more processors, queues to identify updated buffer pool usage corresponding to pending or queued buffer pool requests; and
adjusting, by one or more processors, database object allocation according to the identified updated buffer pool usage,
wherein the adjusting the database object allocation according to the identified updated buffer pool usage comprises reconfiguring the buffer pool resource utilization by moving at least one small data object below a data threshold to a different resource within the one or more buffer pools in response to no resources of the one or more buffer pools having enough space to accommodate a large data object above the data threshold.

2. The computer implemented method of claim 1, further comprising enabling an adjustment of the buffer pool usage utilization via a user interface according to the identified updated buffer pool usage, wherein dynamically mapping database objects to the buffer pools includes classifying the set of database objects according to historical buffer pool placement with respect to past database objects.

3. The computer implemented method of claim 2, wherein classifying the set of database objects includes utilizing a k-nearest neighbors (KNN) algorithm to classify the set of database objects with respect to the past database objects, and the dynamically mapping the database objects to the buffer pools comprises mapping the databases objects to the buffer pools according to previous mapping of past similar database objects to past similar buffer pools according to the KNN algorithm.

4. The computer implemented method of claim 1, wherein defining buffer pool usage corresponding to the set of database objects includes determining a current utilization of the one or more buffer pools by the set of database objects.

5. The computer implemented method of claim 1, wherein the adjusting the buffer pool usage according to the identified updated buffer pool usage further includes:
identifying a buffer pool of the one or more buffer pools exhibiting a maximum usage; and
allocating one or more database objects to a different buffer pool of the one or more buffer pools.

6. The computer implemented method of claim 1, wherein analyzing queues to identify updated buffer pool usage comprises comparing current buffer pool usage to one or more threshold levels with respect to the one or more buffer pools to determine whether any buffer pools are exceeding the one or more threshold levels.

7. The computer implemented method of claim 1, wherein the adjusting the buffer pool usage according to the identified updated buffer pool usage further includes managing a queue of yet-to-be-assigned database objects according to the identified updated buffer pool usage.

8. A computer program product comprising:
one or more computer readable storage media and program instructions stored on the one or more computer readable storage media, the program instructions comprising instructions to:
identify a database comprising one or more buffer pools and a set of database objects;
add a virtual layer between the set of database objects and the one or more buffer pools, wherein the virtual layer is configured to manage buffer pool resource utilization; manage, using the added virtual layer, buffer pool resource utilization with respect to the set of database objects, wherein the program instructions to manage comprise instructions to:
define buffer pool usage corresponding to the set of database objects;
dynamically map database objects to the buffer pools based, at least in part, on the defined buffer pool usage;
analyze, queues to identify updated buffer pool usage corresponding to pending or queued buffer pool requests; and
adjust database object allocation according to the identified updated resource usage,
wherein the program instructions to adjust the database object allocation according to the identified updated buffer pool usage comprise instructions to reconfigure the buffer pool resource utilization by moving at least one small data object below a data threshold to a different resource within the one or more buffer pools in response to no resources of the one or more buffer pools having enough space to accommodate a large data object above the data threshold.

9. The computer program product of claim 8, further comprising program instructions to enable an adjustment of the buffer pool usage utilization via a user interface according to the identified updated buffer pool usage, wherein the program instructions to dynamically map database objects to the buffer pools comprise instructions to classify the set of database objects according to historical buffer pool placement with respect to past database objects.

10. The computer program product of claim 9, wherein the program instructions to classify the set of database objects comprise instructions to utilize a k-nearest neighbors (KNN) algorithm to classify the set of database objects with respect to the past database objects, and the program instructions to dynamically map the database objects to the buffer pools comprise instructions to map the databases objects to the buffer pools according to previous mapping of past similar database objects to past similar buffer pools according to the KNN algorithm.

11. The computer program product of claim 8, wherein the program instructions to define buffer pool usage corresponding to the set of database objects comprise instructions to determine a current utilization of the one or more buffer pools by the set of database objects.

12. The computer program product of claim 8, wherein the program instructions to adjust the buffer pool usage according to the identified updated buffer pool usage further comprise instructions to:

identify a buffer pool of the one or more buffer pools exhibiting a maximum usage; and allocate one or more database objects to a different buffer pool of the one or more buffer pools.

13. The computer program product of claim 8, wherein analyzing queues to identify updated buffer pool usage comprises comparing current resource usage to one or more threshold levels with respect to the one or more buffer pools to determine whether any buffer pools are exceeding the one or more threshold levels.

14. The computer program product of claim 8, wherein the program instructions to adjust the buffer pool usage according to the identified updated buffer pool usage further comprise instructions to manage a queue of yet-to-be-assigned database objects according to the identified resource usage.

15. A computer system comprising:
one or more computer processors;
one or more computer-readable storage media;
program instructions stored on the computer-readable storage media for execution by at least one of the one or more processors, the program instructions comprising instructions to:
identify a database comprising one or more buffer pools and a set of database objects;
add a virtual layer between the set of database objects and the one or more buffer pools, wherein the virtual layer is configured to manage buffer pool resource utilization;
manage, using the added virtual layer, buffer pool resource utilization with respect to the set of database objects, wherein the program instructions to manage comprise instructions to:
define buffer pool usage corresponding to the set of database objects;
dynamically map database objects to the buffer pools based, at least in part, on the defined buffer pool usage;
analyze, queues to identify updated buffer pool usage corresponding to pending or queued buffer pool requests; and
adjust database object allocation according to the identified updated resource usage,
wherein the program instructions to adjust the database object allocation according to the identified updated buffer pool usage comprise instructions to reconfigure the buffer pool resource utilization by moving at least one small data object below a data threshold to a different resource within the one or more buffer pools in response to no resources of the one or more buffer pools having enough space to accommodate a large data object above the data threshold.

16. The computer system of claim 15, further comprising program instructions to enable an adjustment of the buffer pool usage utilization via a user interface according to the identified updated buffer pool usage, wherein the program instructions to dynamically map database objects to the buffer pools comprise instructions to classify the set of database objects according to historical buffer pool placement with respect to past database objects.

17. The computer system of claim 16, wherein the program instructions to classify the set of database objects comprise instructions to utilize a k-nearest neighbors (KNN) algorithm to classify the set of database objects with respect to the past database objects, and the program instructions to dynamically map the database objects to the buffer pools comprise instructions to map the databases objects to the buffer pools according to previous mapping of past similar database objects to past similar buffer pools according to the KNN algorithm.

18. The computer system of claim 16, wherein the program instructions to define buffer pool usage corresponding to the set of database objects comprise instructions to determine a current utilization of the one or more buffer pools by the set of database objects.

19. The computer system of claim 16, wherein the program instructions to adjust the buffer pool usage according to the identified updated buffer pool usage further comprise instructions to:
identify a buffer pool of the one or more buffer pools exhibiting a maximum usage; and
allocate one or more database objects to a different buffer pool of the one or more buffer pools.

20. The computer system of claim 16, wherein analyzing queues to identify updated buffer pool usage comprises comparing current resource usage to one or more threshold levels with respect to the one or more buffer pools to determine whether any buffer pools are exceeding the one or more threshold levels.

* * * * *